United States Patent
Steffens, Jr. et al.

(10) Patent No.: US 6,183,007 B1
(45) Date of Patent: Feb. 6, 2001

(54) THRUST-NEUTRAL INFLATOR MANIFOLD

(75) Inventors: Charles E. Steffens, Jr., Washington; Jinshou Xu; Kwen Hsu, both of Rochester Hills, all of MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/212,093

(22) Filed: Dec. 15, 1998

(51) Int. Cl.$^7$ .................................................. B60R 21/26
(52) U.S. Cl. ........................... 280/736; 280/740; 280/742
(58) Field of Search ................................... 280/736, 737, 280/738, 739, 740, 741, 742

(56) References Cited

U.S. PATENT DOCUMENTS

| | | | |
|---|---|---|---|
| 3,170,387 | * | 2/1965 | Felter . |
| 3,476,403 | * | 11/1969 | Richardson ............................ 280/740 |
| 3,602,526 | * | 8/1971 | Brawn ................................... 280/740 |
| 3,663,036 | * | 5/1972 | Johnson ................................ 280/740 |
| 5,058,921 | * | 10/1991 | Cuevas ................................. 280/741 |
| 5,094,475 | | 3/1992 | Olsson et al. . |
| 5,340,147 | * | 8/1994 | Fontecchio et al. ............. 280/740 X |
| 5,433,476 | * | 7/1995 | Materna et al. ...................... 280/736 |
| 5,462,307 | * | 10/1995 | Webber et al. ....................... 280/737 |
| 5,605,349 | * | 2/1997 | Childree ............................... 280/741 |
| 5,639,112 | | 6/1997 | Phillion et al. . |
| 5,664,802 | * | 9/1997 | Harris et al. ......................... 280/736 |
| 5,799,969 | | 9/1998 | Coleman et al. . |
| 5,848,803 | * | 12/1998 | Tonooka et al. ..................... 280/740 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

An apparatus (12) includes an elongated pressure vessel (30) containing a source of inflation fluid for a vehicle occupant protection device (14). The apparatus (12) further includes an inflation fluid outlet manifold (32) at one end (34) of the pressure vessel (30). The manifold (32) has outlet openings (60, 62) defining first and second outlet flow areas. The manifold (32) is configured to direct inflation fluid flowing through the first outlet flow area to flow at least partially in a first direction parallel to a longitudinal axis (31) of the pressure vessel (30). The manifold (32) is further configured to direct inflation fluid flowing through the second outlet flow area to flow at least partially in a second, opposite direction parallel to the longitudinal axis (31) of the pressure vessel (30).

9 Claims, 3 Drawing Sheets

THRUST-NEUTRAL INFLATOR MANIFOLD

FIELD OF THE INVENTION

The present invention relates to an inflator for an inflatable vehicle occupant protection device, and particularly relates to a manifold for directing inflation fluid from the inflator into the protection device.

BACKGROUND OF THE INVENTION

A particular type of inflatable vehicle occupant protection device is commonly referred to as an air bag. The air bag is stored in a vehicle in a folded, uninflated condition at a location adjacent to the vehicle occupant compartment. When the vehicle experiences a crash, inflation fluid is directed to flow from an inflator into the air bag. The inflation fluid unfolds and inflates the air bag from the stored condition to a deployed condition in which the air bag When the air bag extends into the vehicle occupant compartment, it can engage an occupant of the vehicle to help protect the occupant from a forceful impact with parts of the vehicle. The manner in which the air bag engages the occupant is determined in part by the configuration imparted to the air bag by the inflation fluid as the inflation fluid unfolds and deploys the air bag into the vehicle occupant compartment.

SUMMARY OF THE INVENTION

In accordance with the present invention, an apparatus includes an elongated pressure vessel containing a source of inflation fluid for a vehicle occupant protection device. The apparatus further includes an inflation fluid outlet manifold at one end of the pressure vessel.

The manifold has outlet openings defining first and second outlet flow areas. The manifold is configured to direct inflation fluid flowing through the first outlet flow area to flow at least partially in a first direction parallel to a longitudinal axis of the pressure vessel. The manifold is further configured to direct inflation fluid flowing through the second outlet flow area to flow at least partially in a second, opposite direction parallel to the longitudinal axis of the pressure vessel.

An apparatus constructed in accordance with the present invention can direct an outlet flow of inflation fluid along the length of the elongated pressure vessel. This enables the inflation fluid to be directed into an inflatable vehicle occupant protection device more uniformly than if the outlet flow were concentrated at one end of the pressure vessel. Additionally, the present invention enables the apparatus to be thrust-neutral because the manifold is configured to direct inflation fluid in opposite directions along the longitudinal axis of the pressure vessel.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF PREFERRED EMBODIMENTS

Figure 1:
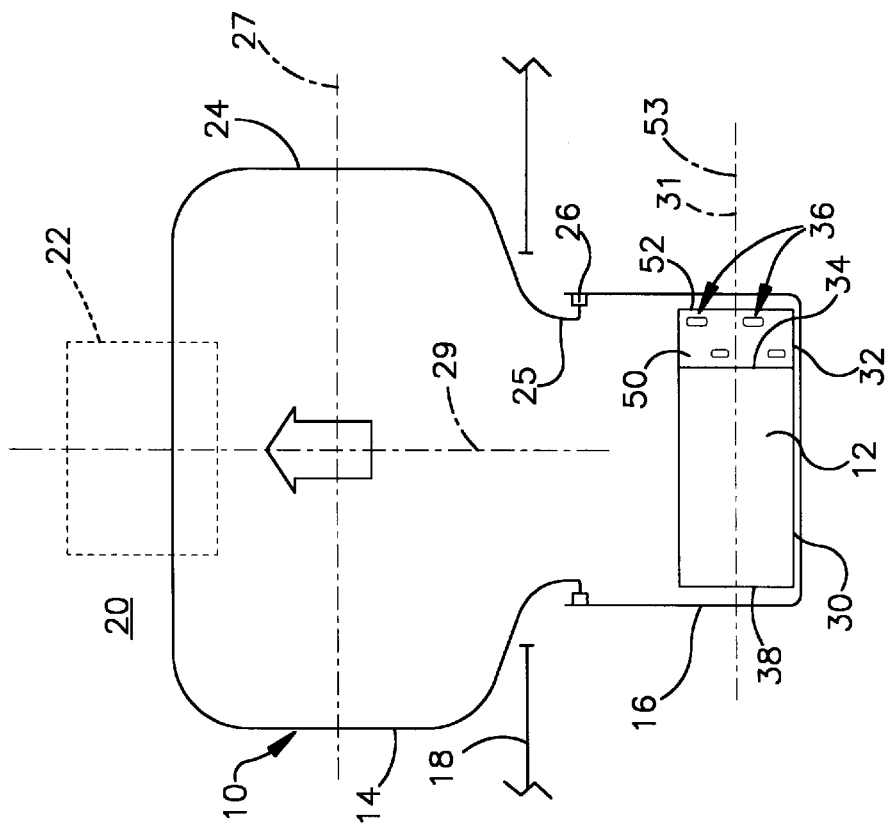
FIG. 1 is a schematic view of a vehicle occupant protection apparatus comprising a first embodiment of the present invention.
Figure 2:
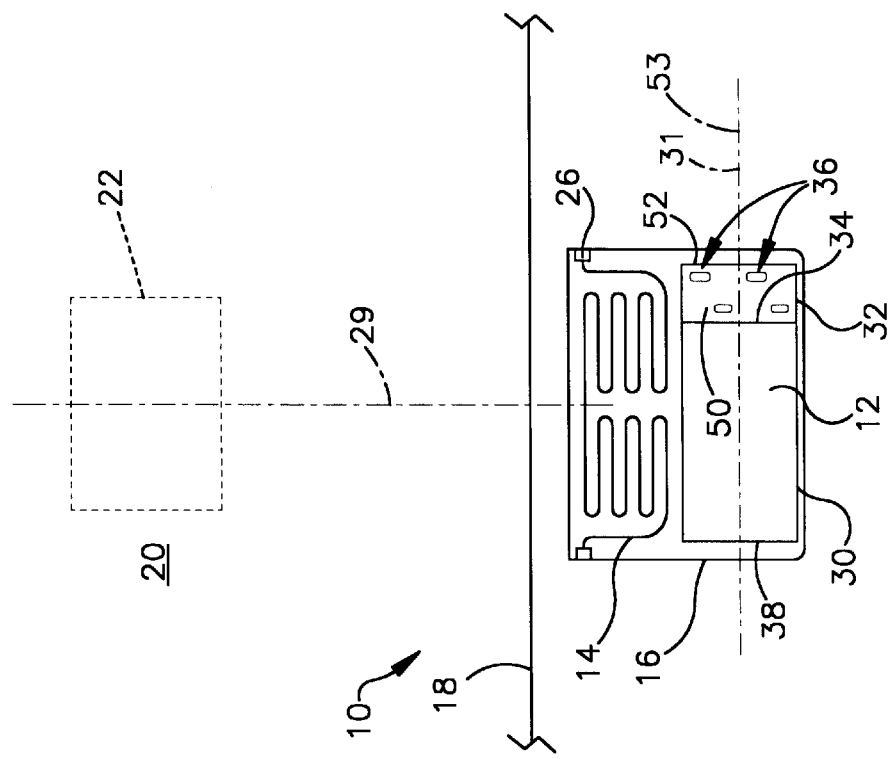
FIG. 2 shows the apparatus of FIG. 1 in an actuated condition.

An apparatus 10 including a first embodiment of the present invention is shown schematically in FIGS. 1 and 2. The apparatus 10 includes an inflator 12 and a particular type of inflatable vehicle occupant protection device 14 which is commonly referred to as an air bag. The air bag 14 is inflatable from a folded, stored condition, as shown in FIG. 1, to an unfolded, deployed condition, as shown in FIG. 2.

The air bag 14 and the inflator 12 are mounted on a supporting structure 16 which, in turn, is mounted on a part 18 of the vehicle adjacent to the vehicle occupant compartment 20. The supporting structure 16 in the first embodiment of the invention is a reaction canister which contains the air bag 14 and the inflator 12. The supporting structure 16 could alternatively comprise a reaction plate or the like. Accordingly, of the vehicle part 18 in the first embodiment is the instrument panel, but could alternatively be the steering column, a door panel, or any other suitable part of the vehicle adjacent to the occupant compartment 20. Moreover, the air bag 14 is located in the vehicle with reference to a specified occupant position 22 in the occupant compartment 20. As indicated by the arrow shown in FIG. 2, the inflating air bag 14 moves toward the specified occupant position 22 to restrain movement of a vehicle occupant in the opposite direction toward the part 18 of the vehicle, i.e. the instrument panel.

The air bag 14 may be constructed of one or more panels of any suitable material known in the art, including woven materials and plastic films. The panels of air bag material are interconnected along seams (not shown) that are formed by stitches, ultrasonic welds, adhesives and/or heat staking, depending on the particular air bag material of which the panels are formed. Preferably, the air bag 14 is constructed of panels formed of a nylon fabric which is coated with silicone. Any suitable arrangement of folds can be used to place the air bag 14 in the folded, stored condition in which it is shown schematically in FIG. 1. Additionally, other inflatable vehicle occupant protection devices that can be used in accordance with the present invention include, for example, inflatable seat belts, inflatable knee bolsters, inflatable head liners or side curtains, and knee bolsters operated by inflatable air bags.

As shown in FIG. 2, the air bag 14 has a body 24 and a neck 25. When the air bag 14 is being inflated from the condition of FIG. 1 to the condition of FIG. 2, the body 24 of the air bag 14 is deployed from the reaction canister 16. The neck 25 of the air bag 14 is anchored in the reaction canister 16 by a retainer ring 26.

The body 24 of the air bag 14 may have any size and shape suitable for restraining movement of a vehicle occupant toward the instrument panel 18. The neck 25 also may have any suitable size and shape. In the first embodiment of the present invention, the body 24 has a generally cylindrical shape. The longitudinal axis 27 of the cylinder extends generally perpendicular to the direction in which the air bag 14 inflates, and extends across a transverse centerline 29 of the air bag 14 when the air bag 14 is fully inflated, as shown in FIG. 2.

The inflator 12 contains a source of inflation fluid for inflating the air bag 14. The inflator 12 may thus contain pressurized inflation fluid, a body of ignitable gas-generating material or a combination of pressurized inflation fluid and ignitable material for heating the inflation fluid. The ignitable material may comprise a fuel gas or a combustible mixture of gases, as known in the art.

As shown schematically in FIGS. 1 and 2, the inflator 12 includes an elongated cylindrical pressure vessel 30 with a longitudinal central axis 31. The pressure vessel 30, which may be referred to as a tank, a bottle, or a housing, contains the source of inflation fluid. The inflator 12 further includes an inflation fluid outlet manifold 32 at one end 34 of the pressure vessel 30. The manifold 32, which may alternatively be referred to as a diffuser, is a relatively short cylindrical structure with a circumferentially extending array of inflation fluid outlet openings 36.

The inflator 12 is actuated in a known manner upon the occurrence of a vehicle crash having at least a specified threshold level of severity. Inflation fluid then flows rapidly outward from the pressure vessel 30 and into the manifold 32. The inflation fluid emerges from the inflator 12 through the openings 36 in the manifold 32. In accordance with the present invention, the manifold 32 is configured to direct some of the inflation fluid emerging from the openings 36 to flow toward the opposite end 38 of the pressure vessel 30. This provides a generally uniform inflation fluid pressure distribution in the supporting structure 16, i.e. the reaction canister, along the length of the inflator 12 as the inflation fluid flows toward and into the air bag 14. The generally uniform pressure distribution causes the inflation fluid to unfold and inflate the air bag 14 generally symmetrically about the centerline 29.

Figure 3:
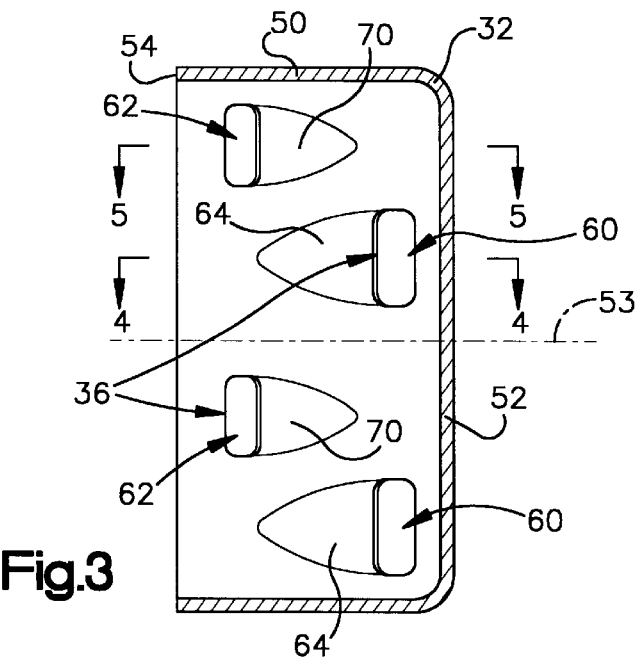
FIG. 3 is a side view, partly in section, of a part of the apparatus of FIG. 1.

As shown separately in FIG. 3, the manifold 32 is a cup-shaped part with a cylindrical side wall 50 and a circular end wall 52, each of which is centered on a longitudinal axis 53. The inflation fluid outlet openings 36 extend radially outward through the side wall 50. The end wall 52 closes the manifold 32 at one end of the side wall 50. The manifold 32 can be mounted coaxially on the pressure vessel 30 (FIGS. 1 and 2) by the use of a welded or crimped joint at or near an annular edge surface 54 at the other end of the side wall 50.

Figure 4:
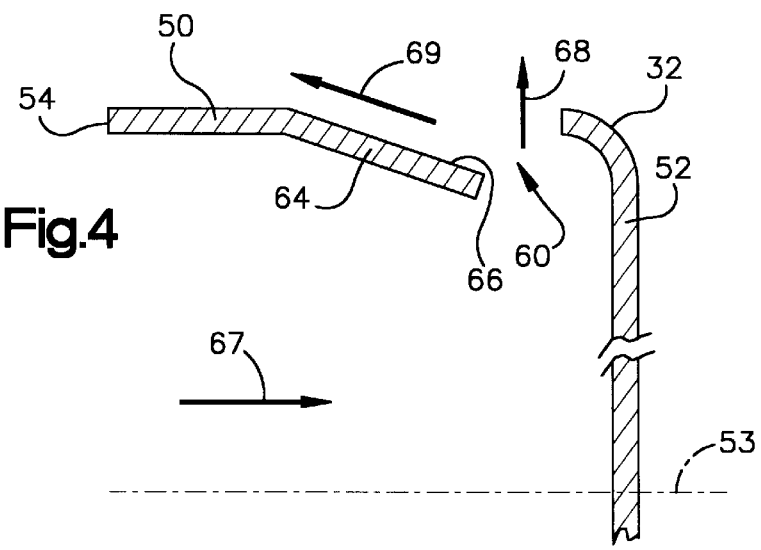
FIG. 4 is a view taken on line 4—4 of FIG. 3.

The inflation fluid outlet openings 36 include first openings 60 and second openings 62. The first openings 60, two of which are shown in FIG. 3, are alike and are evenly spaced apart in a row extending circumferentially around the side wall 50. A corresponding plurality of indented portions 64 of the side wall 50 adjoin the first openings 60. As shown by way of example in FIG. 4, each indented portion 64 of the side wall 50 has an outer surface 66. Each outer surface 66 is inclined radially inward toward the corresponding opening 60, and is located on a side of the opening 60 that is axially remote from the end wall 52.

When the inflator 12 is actuated, the inflation fluid emerges from the pressure vessel 30 and flows axially through the manifold 32 from left to right, as viewed in FIGS. 1 and 2, toward the end wall 52 of the manifold 32. This is indicated generally by the arrow 67 shown in FIG. 4. Some of the inflation fluid flows through the first openings 60 in radially outward directions, as indicated by the arrow 68 shown in FIG. 4. However, the end wall 52 deflects some of the inflation fluid to flow axially from right to left, as viewed in FIG. 4, from the end wall 52 toward the outer surfaces 66 at the opposite sides of the first openings 60. Each outer surface 66 is inclined so as to deflect the inflation fluid further to flow from the manifold 32 in the direction indicated by the arrow 69 shown in FIG. 4. The manifold 32 is thus configured to direct inflation fluid emerging from the first outlet openings 60 to flow at least partially in a direction extending along the axes 53 and 31 toward the opposite end 38 (FIG. 2) of the pressure vessel 30.

Further in accordance with the present invention, the manifold 32 is configured to direct some of the inflation fluid emerging from the second outlet openings 62 (FIG. 3) to flow at least partially in an axially opposite direction, i.e., from left to right as viewed in the drawings. This helps to ensure that the outlet flow of inflation fluid will be thrust-neutral.

Figure 5:
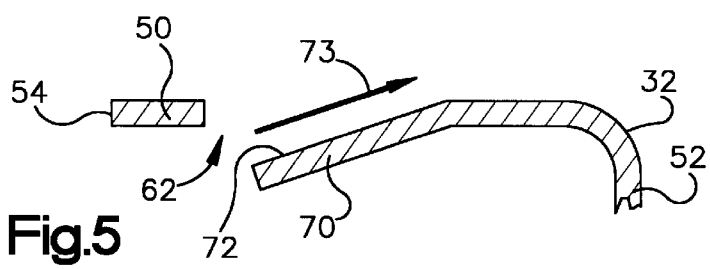
FIG. 5 is a view taken on line 5—5 of FIG. 3.

The second openings 62 also are alike, and also are evenly spaced apart in a row extending circumferentially around the side wall 50. A corresponding plurality of indented portions 70 of the side wall 50 adjoin the second openings 62. As shown by way of example in FIG. 5, each indented portion 70 of the side wall 50 has an outer surface 72. Each outer surface 72 is inclined radially inward toward the corresponding opening 62, and is located axially between the opening 62 and the end wall 52. The outer surfaces 72 beside the second openings 62 are thus inclined equally and oppositely relative to the outer surfaces 66 beside the first openings 60. Accordingly, as indicated by the arrow 73 shown in FIG. 5, each outer surface 72 is inclined to deflect inflation fluid to flow from the manifold 32 at least partially in a direction that is axially opposite the direction indicated by the arrow 69 of FIG. 4.

A particular feature of the present invention relates to the sizes of the first and second outlet openings 60 and 62. The first openings 60 together define a first outlet flow area through which inflation fluid can exit the manifold 32. The second openings 62 together define a second outlet flow area through which inflation fluid can exit the manifold 32. The first and second outlet flow areas could be equal. However, in the first embodiment of the invention, the first flow area defined by the first openings 60 is larger than the second flow area defined by the second openings 62.

As described above with reference to the arrow 67 of FIG. 4, the inflation fluid first flows axially toward the end wall 52 upon actuation of the inflator 12. This promotes an axial thrust developed by the inflation fluid that emerges from the second outlet openings 62 in the direction indicated by the arrow 73 of FIG. 5. The first outlet flow area is greater than the second outlet flow area by an amount sufficient for the inflation fluid that emerges from the first outlet openings 60 to develop an equal and opposite axial thrust.

The manifold 32 in the first embodiment is preferably shaped by pressing the indented portions 64 and 70 of the side wall 50 radially inward against recessed portions of a cylindrical mandrel (not shown) received within the side wall 50. As shown partially in FIGS. 6 and 7, a second embodiment of the present invention includes an alternative manifold 80 with side wall portions 82 and 84 that are deflected radially outward rather than radially inward.

Figure 6:
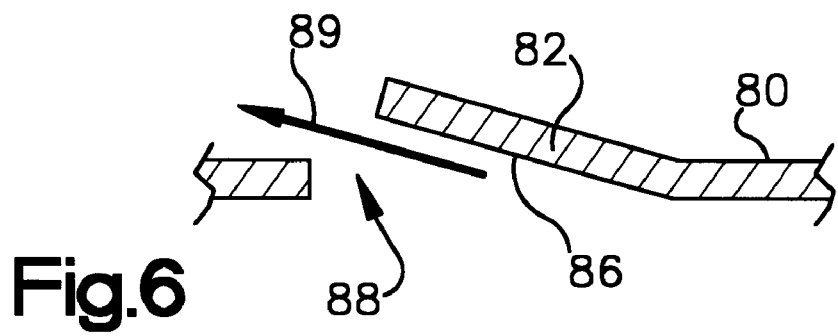
FIGS. 6 and 7 are views similar to FIGS. 5 and 6, respectively, showing a part of an apparatus comprising a second embodiment of the invention.
Figure 7:
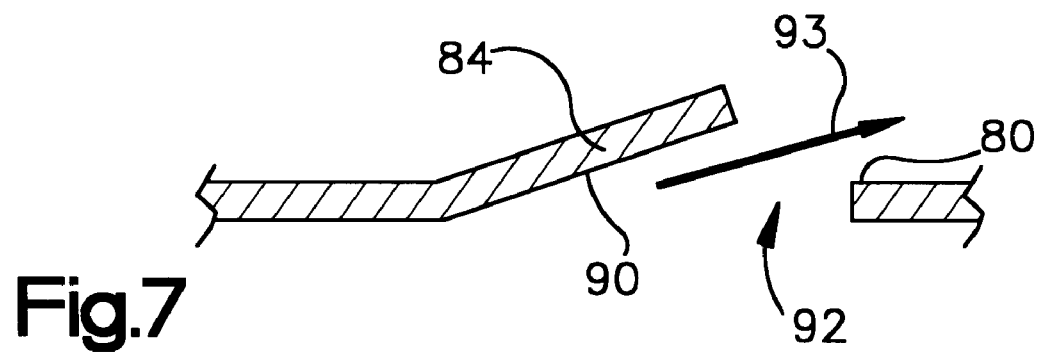

Specifically, the side wall portion 82 of FIG. 6 has an inner surface 86. The inner surface 86 is inclined to deflect inflation fluid outward through an adjoining opening 88 in the direction of the arrow 89. An inner surface 90 of the other side wall portion 84 (FIG. 7) is inclined to deflect inflation fluid outward through an adjoining opening 92 in the direction of the arrow 93. The axial components of the directions indicated by the arrows 89 and 93 extend oppositely relative to one another in the same manner that the axial components of the directions indicated by the arrows 69 and 73 (FIGS. 4 and 5) extend oppositely relative to one another. This enables the alternative manifold 80 also to be thrust-neutral.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an elongated pressure vessel having a longitudinal axis, said pressure vessel containing a source of inflation fluid for a vehicle occupant protection device; and an inflation fluid outlet manifold at one end of said pressure vessel, said manifold having openings defining first and second outlet flow areas;

said manifold being configured to direct inflation fluid flowing through said first outlet flow area to flow at least partially in a first direction parallel to said axis from said one end of said pressure vessel toward an opposite end of said pressure vessel, and being configured to direct inflation fluid flowing through said second outlet flow area to flow at least partially in a second direction parallel to said axis and opposite said first direction, said first outlet flow area being greater than said second outlet flow area.

2. Apparatus as defined in claim 1 wherein said manifold comprises means for causing said inflation fluid to inflate the protection device generally symmetrically with reference to the length of said pressure vessel.

3. Apparatus as defined in claim 1 wherein said outlet flow areas are equal.

4. Apparatus as defined in claim 1 wherein said outlet openings include a plurality of first outlet openings which together define said first outlet flow area and a plurality of second outlet openings which together define said second outlet flow area.

5. Apparatus as defined in claim 1 wherein said manifold has a cylindrical wall with a first outlet opening and a first radially inclined portion adjoining a side of said first outlet opening, said cylindrical wall further having a second outlet opening and a second radially inclined portion adjoining an axially opposite side of said second outlet opening, said radially inclined portions of said cylindrical wall being inclined equally and oppositely relative to one another.

6. Apparatus as defined in claim 5 wherein said radially inclined portions of said cylindrical wall are inclined radially inward.

7. Apparatus as defined in claim 5 wherein said radially inclined portions of said cylindrical wall are inclined radially outward.

8. Apparatus as defined in claim 1, wherein said inflation fluid outlet manifold is centered on said longitudinal axis at said one end of said pressure vessel, and said first and second outlet flow areas encircle said longitudinal axis and are spaced circumferentially around said longitudinal axis.

9. Apparatus as defined in claim 1 further comprising a reaction canister containing said pressure vessel and said manifold, said first and second flow areas being configured to cause said inflation fluid to develop a generally uniform pressure distribution in said canister along said length of said pressure vessel.

* * * * *